United States Patent
Goleski et al.

(10) Patent No.: US 8,298,122 B2
(45) Date of Patent: Oct. 30, 2012

(54) CONTROL OF PARALLEL REACTION BRAKES IN A TRANSMISSION

(75) Inventors: Gregory D. Goleski, Rochester Hills, MI (US); Charles W. Suter, South Lyon, MI (US); Bradley R. Heuver, South Lyon, MI (US); Brad W. Probert, Farmington Hills, MI (US); Kenneth L. Nowaczyk, Algonac, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 436 days.

(21) Appl. No.: 12/574,102

(22) Filed: Oct. 6, 2009

(65) Prior Publication Data
US 2011/0082003 A1    Apr. 7, 2011

(51) Int. Cl.
*B60W 10/18*  (2006.01)
*B60T 13/22*  (2006.01)
*F16H 33/08*  (2006.01)
*F16H 3/44*  (2006.01)

(52) U.S. Cl. ........ 477/183; 477/199; 475/266; 475/259; 475/281

(58) Field of Classification Search ............... 475/324, 475/323, 257, 254
See application file for complete search history.

(56) References Cited

U.S. PATENT DOCUMENTS

| 2,830,472 | A  | * | 4/1958  | Brass            | 475/297 |
|-----------|----|---|---------|------------------|---------|
| 3,150,544 | A  | * | 9/1964  | Brass            | 475/297 |
| 5,514,044 | A  | * | 5/1996  | Antonov          | 475/257 |
| 6,287,233 | B1 |   | 9/2001  | Haka             |         |
| 6,557,682 | B2 |   | 5/2003  | Imamura          |         |
| 7,029,417 | B2 |   | 4/2006  | Borgerson et al. |         |
| 7,223,198 | B2 |   | 5/2007  | Kimes et al.     |         |
| 7,278,944 | B2 | * | 10/2007 | Morise et al.    | 475/121 |
| 7,377,873 | B2 | * | 5/2008  | Shim et al.      | 475/284 |
| 8,092,330 | B2 | * | 1/2012  | Frait            | 475/132 |
| 8,100,809 | B2 | * | 1/2012  | Taniguchi et al. | 475/284 |
| 2004/0186645 | A1 | | 9/2004 | Kohno et al.     |         |

* cited by examiner

*Primary Examiner* — Justin Holmes
*Assistant Examiner* — Colby M Hansen
(74) *Attorney, Agent, or Firm* — David Kelley; MacMillan, Sobanski & Todd, LLC

(57) ABSTRACT

A method for controlling brakes of an automatic transmission including a first brake arranged in parallel with an overrunning brake between a planet pinion carrier and a housing, includes using the overrunning brake to provide brake torque equal to or less than a reference brake torque under positive torque conditions, increasing a torque capacity of the first brake when brake torque is greater than the reference brake torque, and fully engaging the first brake.

17 Claims, 2 Drawing Sheets

CONTROL OF PARALLEL REACTION BRAKES IN A TRANSMISSION

BACKGROUND OF THE INVENTION

1. Field of the Invention

This invention relates generally to a planetary gearing of an automatic transmission for a motor vehicle, and, more particularly to controlling a friction brake arranged in parallel with an overrunning brake.

2. Description of the Prior Art

Automatic transmissions typically include a one-way brake (OWB), sometimes referred to as overrunning brake, as a reaction element in first gear to produce non-synchronous 1-2 upshifts and 2-1 downshifts between first and second gears. The reaction element for first gear has a high torque ratio to input torque and therefore requires a large, heavy, costly one-way brake.

An increase is the number of transmission speed ratios increases the torque ratio on the reaction one-way brake. The torque ratios on the first gear reaction member for transmission having a range of speed ratios is a s follows: 4 speed~1.8, 5-speed~2.1, 6-speed 2.4, 8-speed~2.7. The increased torque ratio requires significantly larger, heavier, and more costly one way brakes.

The first gear reaction one-way brake is usually arranged in parallel with a hydraulically-actuated friction brake, which is engaged in reverse gear and to provide engine braking in manually selected first gear operation. Although this brake may have sufficient torque capacity to carry first gear torque, it must be sized for its required torque ratio in reverse gear for the number of speed ratios produced by the transmission: 4-speed~3.32, 5-speed~3.8, 6-speed~4.6, 8-speed~5.9.

SUMMARY OF THE INVENTION

A method for controlling brakes of an automatic transmission including a first brake arranged in parallel with an overrunning brake between a planet pinion carrier and a housing, includes using the overrunning brake to provide brake torque equal to or less than a reference brake torque under positive torque conditions, increasing a torque capacity of the first brake when brake torque is greater than the reference brake torque, and fully engaging the first brake.

The brake control strategy improves the durability of an overrunning or one-way control transmission device, such as a rocker one-way brake in a planetary gear unit and produces high quality, non-synchronous 1-2 and 2-1 shift events.

The brake control permits the first or hydraulic brake and the overrunning brake to be used in first gear during high torque events without affecting non-synchronous 1-2 and 2-1 shift events.

Because the maximum torque transmitted by the one-way brake is reduced due to the effect of the hydraulic brake, the cost, weight, and package size of the one-way brake are reduced.

One-way brakes typically react at only one or two points causing unusual carrier deflections and higher gear tooth loads, whereas hydraulic brakes typically react 360 degrees around the planetary carrier causing a normal deflection pattern in the planetary carrier and improved gear tooth loads. Planetary carrier deflection is reduced and gear robustness improved.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
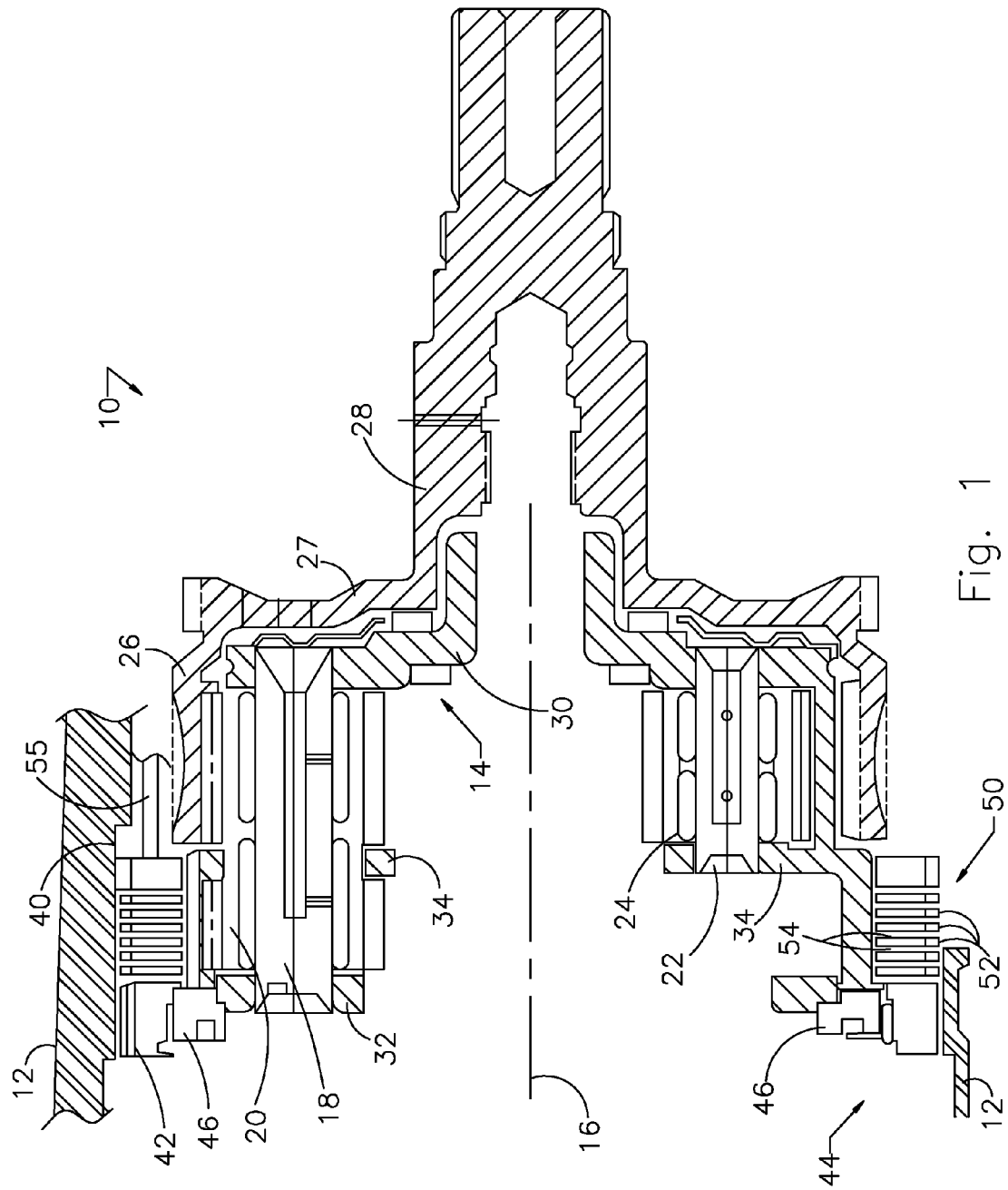
FIG. 1 is a cross section of a portion of the kinematic assembly for an automatic transmission that includes a Ravigneaux gear set.

Referring to FIG. 1, a planetary gear assembly 10 of the Ravigneaux type located in a transmission housing 12 includes a first and second sun gears (not shown); a planet pinion carrier 14, which is supported for rotation about an axis 16; long pinion shafts 18, each spaced angularly about axis 16 and supported on carrier 14; a long planet pinions 20, each spaced angularly about axis 16, supported for rotation on one of the long pinion shafts 18 and meshing with one of the first sun gears; short pinion shafts 22, spaced angularly about axis 16 and supported on carrier 14; a set of short planet pinions 24 supported for rotation on the short pinion shafts 22 and meshing with the second sun gears and the long pinions 20; and a ring gear 26 engaged with the long pinions 20 and arranged coaxially with the sun gears and pinions 20, 24. An integral ring gear assembly comprising ring gear 26, disc 27 and output shaft 28, is supported for rotation about axis 16.

The carrier 14 includes a first disc 30; a second disc 32, spaced axially from the first disc; and a third disc 34, located between discs 30, 32. The carrier discs 30, 32, 34 support the pinion shafts 18, 22, on which pinions 20, 24 are supported for rotation, respectively.

The transmission housing 12 is formed at an inner surface with axially directed spline teeth 40, which are engaged with external spline teeth formed on the circumferential periphery of the outer ring 42 of a rocker one-way or overrunning brake 44. An annular pilot recess on the inner ring 46 of brake 44 is engaged by carrier disc 32. U.S. Pat. No. 7,383,930 discloses the structure and operation of a rocker one-way clutch similar to brake 44.

A low/reverse hydraulically-actuated friction brake 50 includes discs 52, splined at their outer periphery to housing 12, and plates 54, interleaved with discs 52 and splined at their inner periphery to the intermediate disc 34 of carrier 14. A servo piston 55 moves axially leftward to force the discs 52 and plates 54 into mutual friction contact. The force of the actuating piston is reacted on the housing 12 due to the outer ring 42 being secured against axial displacement.

An overrunning brake alternately engages to secure a component of the kinematic arrangement against rotation in one direction relative the housing 12, and disengages to release the component to rotate freely in the opposite direction. A overrunning clutch alternately engages to secure two components of the kinematic arrangement against relative rotation when the speed of a first component is greater than that of a second component in one direction and disengages to release the components to rotate relative to one another when the speed of the second component is greater than that of the first component.

Figure 2:
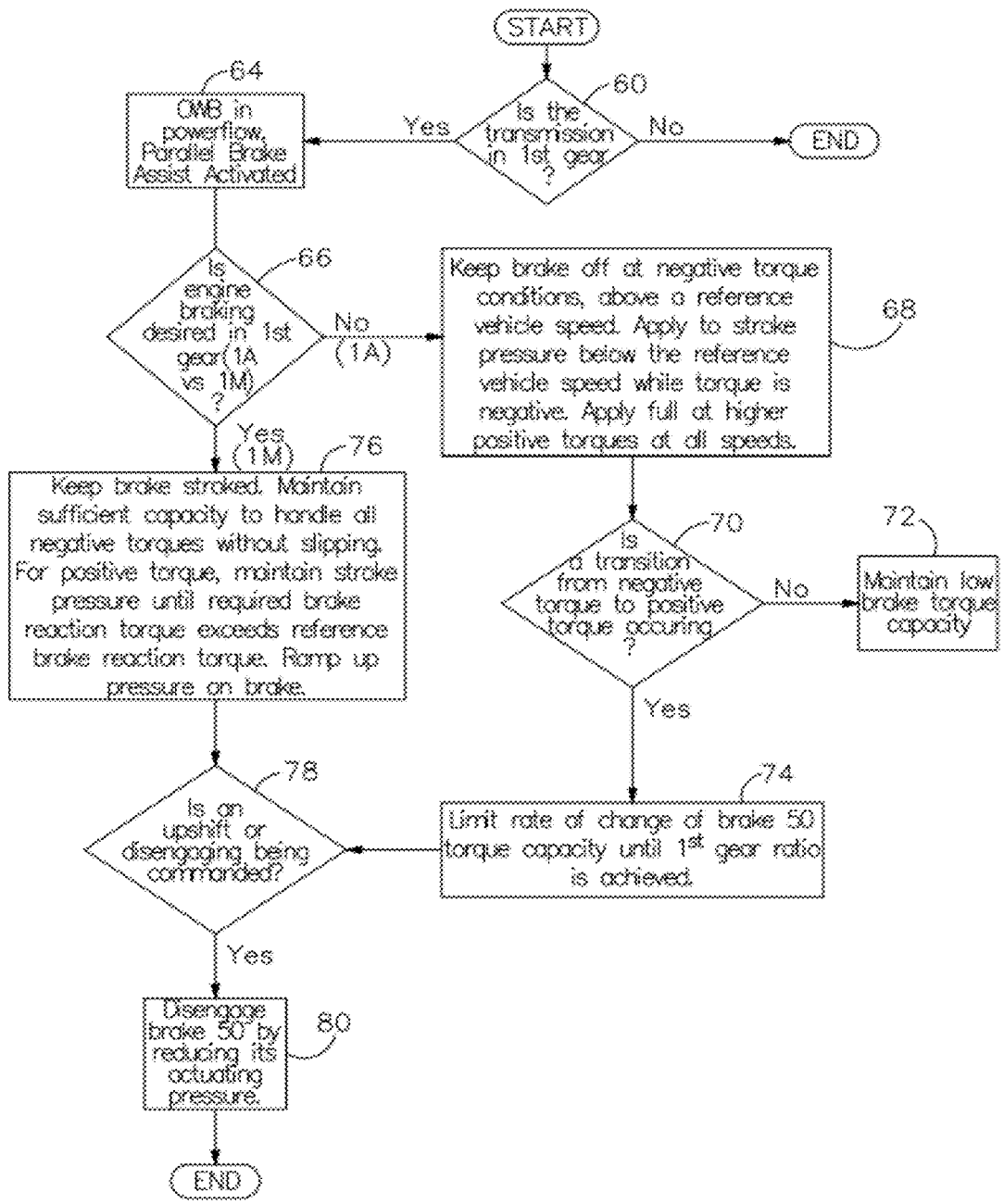
FIG. 2 illustrates a logic flow diagram of a strategy for controlling the friction brake shown in FIG. 1.

Referring now to FIG. 2, which illustrates a control strategy that utilizes the hydraulic low/reverse brake 50 in first gear during high torque events to maintain torque load on the one-way brake 44 at an acceptable magnitude and to reduce deflections of the planetary carrier 14.

At step 60 a test is made to determine whether the transmission is operating in first gear. If the result of test 60 is logically false, at step 62 the parallel assist control is terminated. If the result of test 60 is logically true, at step 64 the OWB 44 is in the powerflow, and parallel brake assist control is activated.

At step 66 a test is made to determine whether engine braking is desired in first gear, i.e., whether first gear was manually selected (1M) or automatically selected (1A).

If the result of test 66 is true, indicating that engine braking is desired and the transmission is in gear 1M, at step 76 keep brake 50 stroked at all times, maintaining sufficient torque capacity in brake 50 to handle all negative torque conditions without allowing the brake to slip. For positive torque conditions, maintain pressure in brake 50 just above stoke pressure until the brake reaction torque carried by one-way brake 44 exceeds the brake torque at which parallel brake assist is desired, referred to as the reference brake reaction torque.

Under positive torque conditions, torque is transmitted from the engine through the output shaft 28 to the vehicle wheels. Under negative torque conditions, torque is transmitted from the vehicle wheels through the output shaft 28 to the engine, such as when the vehicle is coasting down hill. The one-way brake 44 overruns during negative torque conditions.

Brake 50 is alternately engaged and disengaged in response to the magnitude of pressure applied to a servo cylinder that actuates servo piston 55. Stroke pressure is the magnitude of pressure applied to that servo such that clearances among the servo piston 55, discs 52 and plates 54 are removed by moving them into mutual friction contact, but without transmitting torque through the brake. The low/reverse brake 50 has substantially no torque transmitting capacity when stroke pressure is present in the servo cylinder that actuates piston 55.

At step 70 a test is made to determine whether a transition from a negative torque condition to a positive torque condition is occurring based on an engine torque signal.

If the result of test 70 is false, at step 72 actuating pressure in brake 50 is maintained at a low magnitude to prevent engine braking.

If the result of test 70 is true, at step 74 monitor the transmission gear ratio for overrunning, i.e., a ratio greater than the first gear ratio. Limit the rate of change of pressure in the low/reverse brake 50 until the first gear ratio is produced. This is necessary to prevent a possible bump or torque disturbance from the low reverse brake 50 that would increase engine speed faster than the transition from negative torque to positive torque is increasing engine speed via engine combustion torque.

If the result of test 66 is true, indicating that engine braking is desired and the transmission is in gear 1M, at step 76 keep brake 50 stroked at all times, maintaining sufficient torque capacity in brake 50 to handle all negative torque conditions without allowing the brake to slip. For positive torque conditions, maintain pressure in brake 50 just above stoke pressure until the brake reaction torque carried by brake one-way 44 exceeds the brake torque at which parallel brake assist is desired, referred to as the reference brake reaction torque.

The reference brake reaction torque is determined with reference to the endurance limit, required service life, strength and performance characteristics of the one-way rocker brake 44 in addition to in-service deflections of the carrier 14 and NVH effects.

At step 78 a test is made to determine whether disengagement of low/reverse brake 50 is required such as when an upshift from first gear is being commanded. If the result of test 78 is true and regardless of whether the transmission is in operating in gear 1M or gear 1A, at step 80 pressure actuating the low/reverse brake 50 is reduced to a magnitude at which the brake is released and fully disengaged.

In accordance with the provisions of the patent statutes, the preferred embodiment has been described. However, it should be noted that the alternate embodiments can be practiced otherwise than as specifically illustrated and described.

The invention claimed is:

1. A method for controlling brakes of an automatic transmission including a first brake arranged in parallel with an overrunning brake between a planet pinion carrier and a housing, comprising the steps of:
   (a) under positive torque conditions, using the overrunning brake to provide brake torque equal to or less than a reference brake torque;
   (b) increasing a torque capacity of the first brake when brake torque is greater than the reference brake torque; and
   (c) fully engaging the first brake.

2. The method of claim 1, wherein step (a) further comprises stroking the first brake.

3. The method of claim 1, further comprising (a) using the first brake to produce brake torque under negative torque conditions.

4. The method of claim 1, further comprising disengaging the first brake to permit a gear change to occur.

5. The method of claim 1, further comprising:
   under negative torque conditions when a current gear is produced automatically by the transmission, using the first brake to provide brake torque;
   fully disengaging the first brake when a speed of an output shaft is greater than a predetermined speed; and
   stroking the first brake when the output shaft speed is less than the predetermined speed.

6. The method of claim 5, further comprising:
   under positive torque conditions fully engaging the first brake regardless of output shaft speed.

7. The method of claim 5, further comprising:
   if a change from negative to positive torque conditions occurs, limiting a rate of change of torque capacity of the first brake until a speed ratio across the transmission corresponds to one gears of the transmission.

8. The method of claim 1, further comprising:
   under positive torque conditions when a current gear is produced automatically by the transmission, fully engaging the first brake regardless of output shaft speed.

9. The method of claim 1, further comprising:
   if a change from negative to positive torque conditions occurs, limiting a rate of change of torque capacity of the first brake until a speed ratio across the transmission corresponds to one gears of the transmission.

10. A method for controlling brakes of an automatic transmission including a first brake arranged in parallel with an overrunning brake between a planet pinion carrier and a housing, comprising the steps of:
    (a) under positive torque conditions, using the overrunning brake to provide brake torque equal to or less than a reference brake torque;
    (b) increasing a torque capacity of the first brake when brake torque is greater than the reference brake torque;

(c) fully engaging the first brake;
(d) under a negative torque conditions when a current gear is produced automatically by the transmission, using the first brake to provide brake torque;
(e) under a negative torque conditions when a current gear is produced automatically by the transmission, fully disengaging the first brake when a speed of an output shaft is greater than a predetermined speed; and
(f) under a negative torque conditions when a current gear is produced automatically by the transmission, stroking the first brake when the output shaft speed is less than a predetermined speed.

11. The method of claim 10, wherein step (a) further comprises stroking the first brake.

12. The method of claim 10, further comprising (a) using the first brake to produce brake torque under negative torque conditions.

13. The method of claim 10, further comprising disengaging the first brake to permit a gear change to occur.

14. A method for controlling brakes of an automatic transmission including a first brake arranged in parallel with an overrunning brake between a planet pinion carrier and a housing, comprising the steps of:

(a) under positive torque conditions, stroking the first brake and using the overrunning brake to provide brake torque equal to or less than a reference brake torque;
(b) increasing a torque capacity of the first brake when brake torque is greater than the reference brake torque;
(c) fully engaging the first brake;
(d) disengaging the first brake to permit a gear change to occur.

15. The method of claim 14, further comprising:
under negative torque conditions when a current gear is produced automatically by the transmission, using the first brake to provide brake torque;
fully disengaging the first brake when a speed of an output shaft is greater than a predetermined speed; and
stroking the first brake when the output shaft speed is less than a the predetermined speed.

16. The method of claim 14, further comprising:
under positive torque conditions fully engaging the first brake regardless of output shaft speed.

17. The method of claim 14, further comprising:
if a change from negative to positive torque conditions occurs, limiting a rate of change of torque capacity of the first brake until a speed ratio across the transmission corresponds to one gears of the transmission.

* * * * *